(12) United States Patent
Nohara et al.

(10) Patent No.: US 6,883,476 B1
(45) Date of Patent: Apr. 26, 2005

(54) CONTROL SYSTEM AND METHOD FOR AN INTERNAL COMBUSTION ENGINE

(75) Inventors: Tsuneyasu Nohara, Kanagawa (JP); Shinichi Takemura, Yokohama (JP); Takanobu Sugiyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/649,973

(22) Filed: Aug. 28, 2003

(30) Foreign Application Priority Data

Sep. 24, 2002 (JP) .................................. 2002-277092

(51) Int. Cl.[7] .................................................. F01L 1/34
(52) U.S. Cl. .............................. 123/90.15; 123/90.16; 123/90.17
(58) Field of Search ........................ 123/90.15, 90.16, 123/90.17, 90.31

(56) References Cited

U.S. PATENT DOCUMENTS 5,522,352 A * 6/1996 Adachi et al. ........... 123/90.15
6,079,381 A * 6/2000 Morikawa ................ 123/90.15
6,158,545 A * 12/2000 Kaji et al. ................... 180/446
6,481,304 B1 * 11/2002 Yoshioka et al. ............. 74/335

FOREIGN PATENT DOCUMENTS

JP     11-107725 A    4/1999
JP     2002-21592 A    1/2002

* cited by examiner

*Primary Examiner*—Thomas Denion
*Assistant Examiner*—Zelalem Eshete
(74) *Attorney, Agent, or Firm*—Foley & Lardner LLP

(57) ABSTRACT

A control system for an internal combustion engine having a variable valve operating mechanism capable of varying at least one of a valve lift and an operation angle of an engine valve continuously is provided. The control system comprises a detecting device that detects an operating condition of the variable valve operating mechanism and produces a signal representative thereof, and a controller that controls the operating condition of the variable valve operating mechanism in response to the signal from the detecting device. The controller is programmed to determine whether an operation responsiveness of the variable valve operating mechanism is lowered based on the signal from the detecting device and vary operational characteristics of the variable valve operating mechanism when the operation responsiveness of the variable valve operating mechanism is lowered. A control method is also provided.

17 Claims, 11 Drawing Sheets

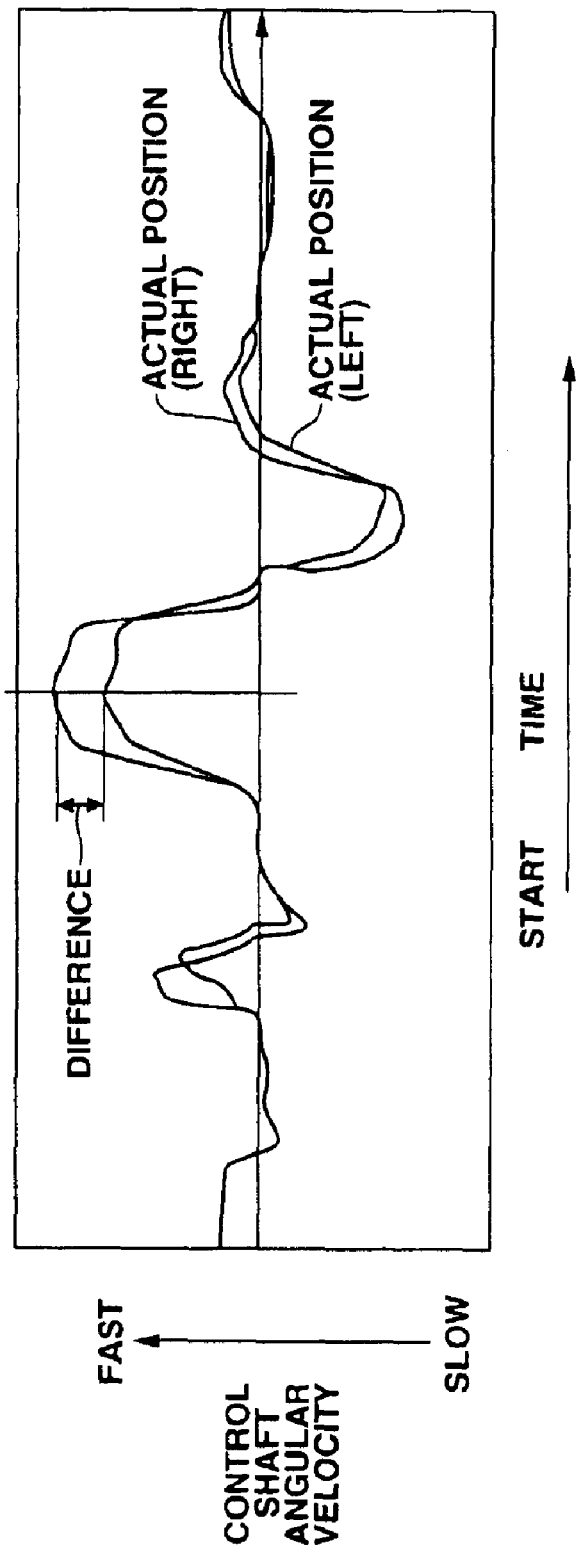

CONTROL SYSTEM AND METHOD FOR AN INTERNAL COMBUSTION ENGINE

BACKGROUND OF THE INVENTION

The present invention relates to a control system for an internal combustion engine having a variable control mechanism for variably controlling engine performance characteristics according to an engine operating condition. More specifically, the present invention relates to a control system and method for an internal combustion engine having a variable valve operating mechanism capable of varying at least one of a valve lift and an operating angle of an engine valve (i.e., an intake valve or an exhaust valve) in accordance with an engine operating condition.

Heretofore, the assignee of this application proposed a control system for an internal combustion engine having a variable valve operating mechanism, which will be described briefly in the following.

The variable valve operating mechanism is adapted for use with an intake valve and includes an eccentric cam fixedly attached to a drive shaft that is rotatable in timed relation with a crank shaft, and an oscillation cam having a cam surface in sliding contact with an upper surface of a valve lifter provided to an upper end portion of the intake valve and driven by the drive cam by way of a multi-link type transmission mechanism to open and close the intake valve.

The above-described transmission mechanism includes a rocker arm disposed above the oscillation cam and mounted on a control shaft for oscillation motion, a pivotal link having an annular base portion rotatably mounted on a circular external surface of the eccentric cam and a protruded arm portion pivotally connected to an end portion of the rocker arm, and a connecting rod having an end portion pivotally connected to another end portion of the rocker arm and another end portion pivotally connected to a cam nose side end portion of the oscillation cam.

Further, fixedly mounted on the control shaft is an eccentric control cam having a geometric or oscillation center that is offset from a rotational axis of the control shaft. The rocker arm is mounted at a central portion thereof on the control cam. The control shaft is thus capable of varying the oscillation center of the rocker arm depending upon a variation of rotational position or phase thereof, thereby varying the position at which the oscillation cam is in sliding contact with the upper surface of the valve lifter and variably controlling the valve lift and operation angle of the intake valve.

Namely, when the engine operating condition is, for example, in a low speed-low load range, the control shaft is rotated in one direction by an actuator that is constituted by an electric motor, thus causing the control shaft to rotate in the same direction and thereby moving the pivot center of the rocker arm to move in one direction. By this, the pivot center of the joint between the rocker arm and the link arm and the pivot center of the joint between the rocker arm and the connecting rod are displaced so as to pull the cam nose side end portion of the oscillation cam upward and thereby cause the position at which the oscillation cam is brought into contact with the upper surface of the valve lifter to move toward the base circle side. Accordingly, the valve lift characteristics of the intake valve is controlled so as to attain a small lift.

On the other hand, when the engine operating condition changes into a high speed-high load range, the electric motor is driven in the opposite direction, thus allowing the control cam to be driven in the opposite direction and into a predetermined position by the control shaft and thereby causing the oscillation center of the rocker arm to move in the opposite direction. By this, the cam nose side end portion of the oscillation cam is pushed down by means of the link arm, thus causing the position at which the oscillation cam is in contact with the upper surface of the valve lifter to move toward the cam nose side and thereby controlling the valve lift characteristics of the intake valve so as to attain a large lift.

Accordingly, the control system can improve the engine performance and efficiency, such as fuel consumption and output, in accordance with the engine operating condition.

SUMMARY OF THE INVENTION

In the meantime, it has not heretofore been made a diagnosis of various portions of the electric motor serving as an actuator in the above-described control system, with respect to deterioration thereof that is liable to be caused after a long period of usage. Namely, the electric motor has various portions having a possibility of being deteriorated, for example, increase in the contact resistance of a brush portion with the passage of time, partial breakage of an armature, rare short of the armature, etc. may possibly occur. However, a detailed diagnosis with respect to such deterioration has not been made.

Accordingly, if a usual operation angle control is continued after occurrence of some deterioration of the electric motor, there is a possibility that the electric motor undergoes rapid deterioration.

It is accordingly an object of the present invention to provide a control system for an internal combustion engine that determines a deteriorated condition of an actuator based on an operation responsiveness thereof and prevents the performance and efficiency of the engine from being deteriorated by the influence of the deteriorated operation responsiveness of the actuator.

It is a further object of the present invention to provide a control method for an internal combustion engine that is executed by the control system of the foregoing character.

To achieve the above object, there is provided according an aspect of the present invention a control system for an internal combustion engine having a variable control mechanism that variably controls engine performance characteristics in accordance with an engine operating condition, comprising a detecting device that detects an operating condition of the variable control mechanism and produces a signal representative thereof, and a controller that controls the operating condition of the variable control mechanism in response to the signal from the detecting device, the controller being programmed to determine whether an operation responsiveness of the variable control mechanism is lowered based on the signal from the detecting device and vary operational characteristics of the variable control mechanism when the operation responsiveness is lowered.

According to another aspect of the present invention, there is provided a control system for an internal combustion engine having a variable valve operating mechanism capable of varying at least one of a valve lift and an operation angle of an engine valve continuously, comprising a detecting device that detects an operating condition of the variable valve operating mechanism and produces a signal representative thereof, and a controller that controls the operating condition of the variable valve operating mechanism in response to the signal from the detecting device, the controller being programmed to determine whether an operation responsiveness of the variable valve operating mechanism is lowered based on the signal from the detecting device and vary operational characteristics of the variable valve operating mechanism when the operation responsiveness of the variable valve operating mechanism is lowered.

According to a further aspect of the present invention, there is provided a control method for an internal combustion engine having a variable valve operating mechanism capable of varying at least one of a valve lift and an operation angle continuously, the method comprising detecting an operating condition of the variable valve operating mechanism and producing a signal representative thereof by means of a detecting device, and controlling the operating condition of the variable valve operating mechanism in response to the signal from the detecting device, the controlling including determining whether an operation responsiveness of the variable valve operating mechanism is lowered based on the signal from the detecting device and varying operational characteristics of the variable valve operating mechanism when the operation responsiveness of the variable valve operating mechanism is lowered.

BRIEF DESCRIPTION OF THE DRAWINGS

FIG. 11 is a view similar to FIG. 10 but shows a modification of the embodiment of FIG. 10;

DESCRIPTION OF THE PREFERRED EMBODIMENTS

Figure 1:
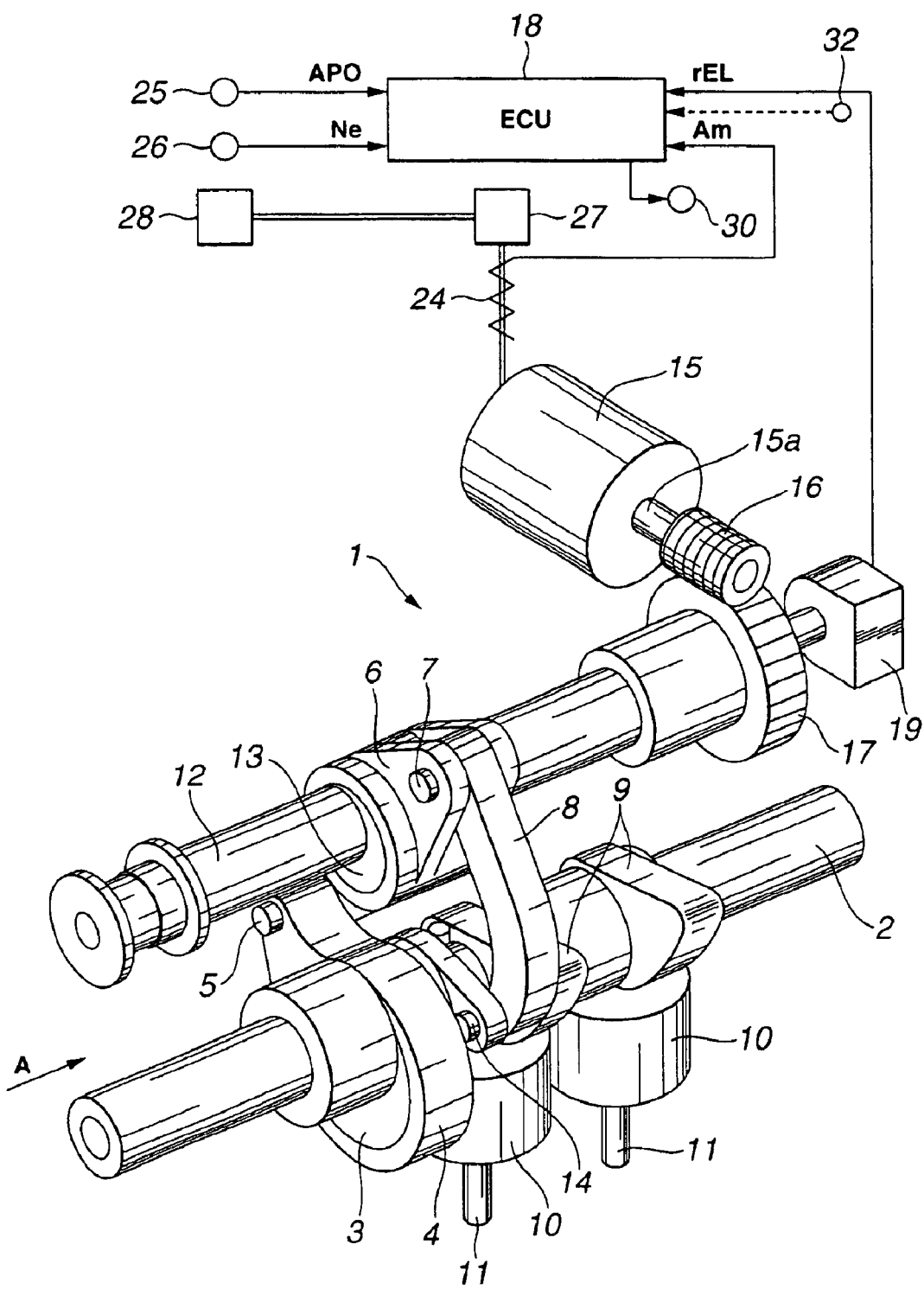
FIG. 1 is a schematic view of a control system for an internal combustion engine according to an embodiment of the present invention, together with a variable valve operating mechanism being shown in a perspective view.
Figure 2:
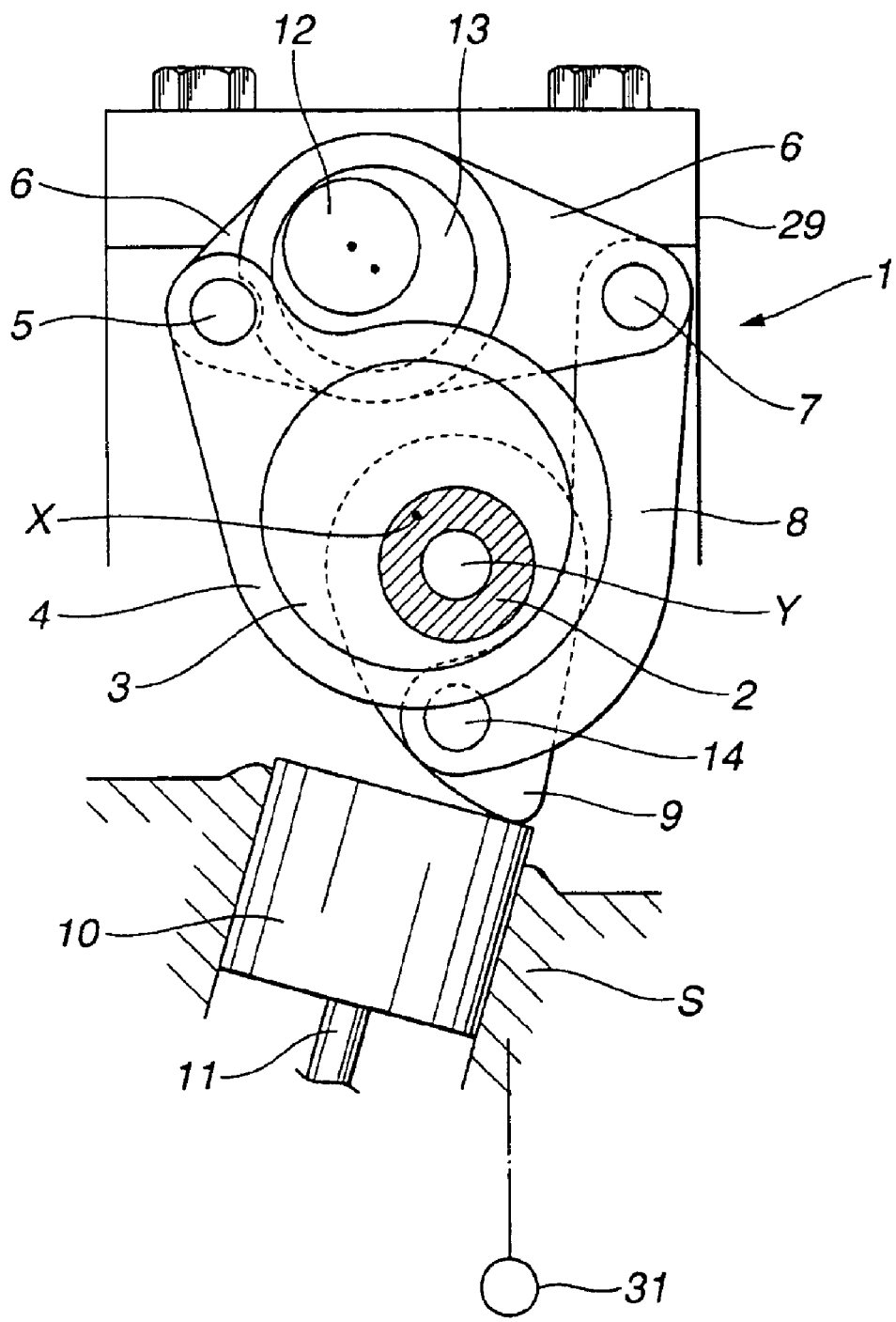
FIG. 2 is a view taken in the direction of the arrow "A" in FIG. 1.
Figure 3:
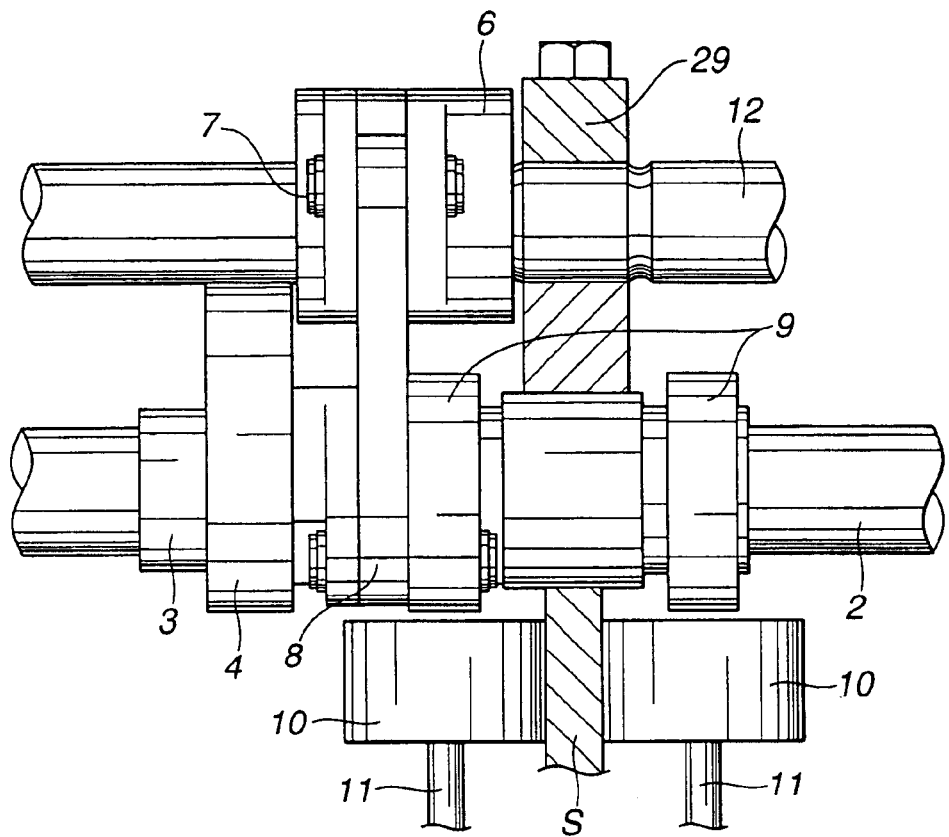
FIG. 3 is a side elevation of the variable valve operating mechanism of FIG. 1.

Referring first to FIGS. 1 to 3, a control system for an internal combustion engine according to an embodiment of the present invention will be described. In this embodiment, the internal combustion engine is a spark-ignited gasoline engine and has a variable control mechanism for variably controlling engine performance characteristics. In this embodiment, the variable control mechanism is a variable valve operating mechanism generally indicated by 1.

Variable valve operating mechanism 1 is disclosed in Unexamined Japanese Patent Publication No. 11-107725 and therefore only brief description thereof will be made.

The engine includes a pair of intake valves 11 provided to each cylinder (not shown) and slidably installed on cylinder head S. Variable valve operating mechanism 1 includes drive shaft 2 rotatably supported on cylinder head S by cam bracket 29, eccentric cam 3 force-fitted on or otherwise fixedly attached to drive shaft 2, control shaft 12 disposed above and in parallel to drive shaft 2 and rotatably supported on cylinder head S by cam bracket 29, rocker arm 6 swingably or pivotally mounted at a central portion thereof on control cam 13 of control shaft 12, and a pair of oscillation cams 9 in abutting engagement with respective valve lifters 10 each provided to each intake valve 11. Eccentric cam 3 and rocker arm 6 are connected by pivotal link 4, and rocker arm 6 and oscillation cam 9 are connected by connecting rod 8.

Drive shaft 2 is driven by a crankshaft (not shown) of the engine by way of a timing chain or belt (not shown).

Eccentric cam 3 has a cylindrical outer circumferential surface, a center axis of which is offset by a predetermined amount from a rotational axis of drive shaft 2. On the cylindrical outer circumferential surface of eccentric cam 3 is pivotally mounted an annular base portion of pivotal link 4.

Rocker arm 6 is pivotally mounted at the central portion thereof on control cam 13 and has an end portion to which a protruded arm portion of pivotal link 4 is pivotally connected by way of connecting pin 5 and another end portion to which an upper end portion of connecting rod 8 is pivotally connected by way of connecting pin 7. Since control cam 13 is disposed eccentrically with control shaft 12, the oscillation center of rocker arm 6 varies depending upon a variation of a rotational position or phase of control shaft 12.

Each oscillation cam 9 is rotatably mounted on the outer circumferential periphery of drive shaft 2 and has a laterally elongated end portion to which a lower end portion of connecting rod 8 is pivotally connected. Oscillation cam 9 has at a lower side thereof a basic circular or dwell surface and cam or lift surface extending from the basic circular surface toward the lateral end portion so as to have a predetermined curved profile. The basic circular surface and cam surface are brought into engagement with the upper surface of valve lifter 10 in response to oscillation of oscillation cam 9.

Namely, the basic circular surface serves as a base circle area that regulates an amount of lift to zero. When oscillation cam 9 is turned or rotated to bring the cam surface serving as a lift or rise area into contact with valve lifter 10, there is caused a lift of intake valve 11 that increases gradually with further rotation of oscillation cam 9. In the meantime, between the basic circular area and the lift area is provided a small ramp area.

Control shaft 12 is constructed so as to be rotatable within a predetermined rotational angle range by being driven by an actuator made up of electric motor 15. Electric motor 15 is a servo motor and controlled by a control signal from engine control unit (ECU) 18 so as to drive control shaft 12 by way of worm gear 16 fixed to drive shaft 15a of electric motor 15 and worm wheel 17 fixed to control shaft 12. In this connection, the rotational angle of control shaft 12 is detected by control shaft sensor 19 that serves as a detecting means or device, and based on the detected actual operating condition is close-loop controlled electric motor 15.

Figure 4:
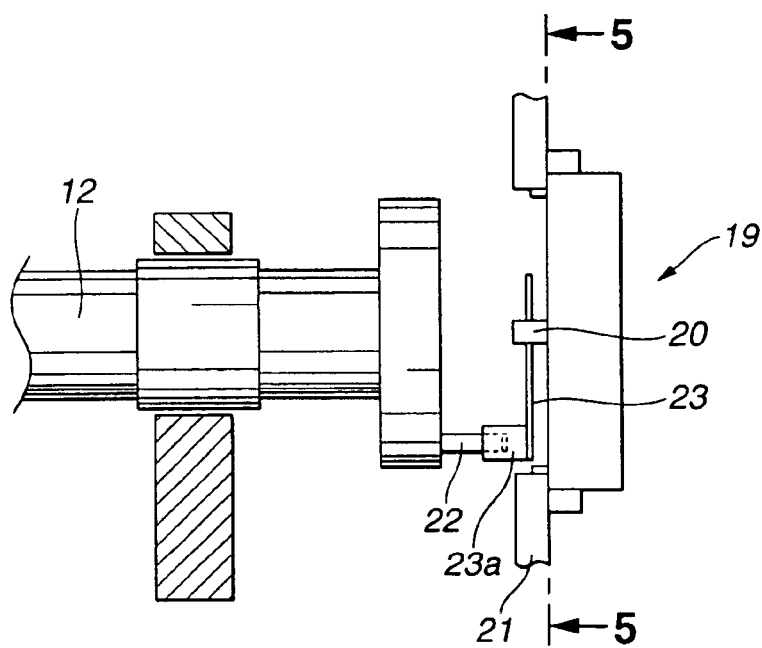
FIG. 4 is a side elevation of a control shaft sensor of the control system of FIG. 1.
Figure 5:
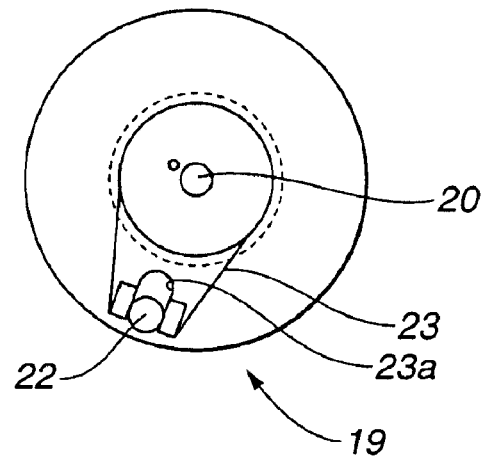
FIG. 5 is a sectional view taken along the line 5—5 of FIG. 4.

Control shaft sensor 19, as shown in FIGS. 4 and 5, is made up of a rotational type potentiometer that generates a sensor output corresponding to a rotational angle of sensor shaft 20. Sensor shaft 20 is fixedly attached to side wall 21 of cylinder head S (refer to FIG. 2) so as to be coaxial with control shaft 12. Sensor shaft 20 and control shaft 12 are not directly connected to each other so as to allow an error or a variation in the respective centers. Control shaft 12 has sensor pin 22 disposed at a radially outer end surface portion thereof, whereas base plate 23 having radial slit 23a is attached to sensor shaft 20. Sensor pin 22 is engaged in sensor slit 23a so that rotation of control shaft 12 is transmitted to sensor shaft 20.

Inputted to engine control unit 18 in addition to the output signal of control shaft sensor 19 are, as shown in FIG. 1, an output signal from current sensor 24 that detects drive current of electric motor 15, an output signal from accel pedal position sensor 25 that detects accelerator opening degree APO and an output signal from engine speed sensor 26 that detects engine speed Ne. Engine control unit 18 calculates a drive signal to be transmitted to drive circuit 27 of electric motor 15 based on the output signals from above-described sensors 19, 24, 25, 26.

Drive circuit 27 connects across electric motor 15 and battery 28 and is adapted to regulate an electric power to be supplied to electric motor 15 in response to a drive signal from engine control unit 18.

The operation of variable valve operating mechanism 1 will now be described. Rotation of drive shaft 2 causes pivotal link 4 to move up and down by the operation of eccentric cam 3. This causes rocker arm 6 to oscillate thereby causing oscillation cam 9 to oscillate. Oscillating motion of oscillation cam 9 causes valve lifter 10 to move up and down thereby causing intake valve 11 to open and close.

In this connection, when a variation of the rotational position or phase of control shaft 12 is caused by electric motor 15, the oscillation center of rocker arm 6 is moved to cause a variation of the initial position of rocker arm 6 and thereby cause a variation of the initial position of oscillation cam 20.

For example, when control cam 13 is generally positioned in a higher place in the drawing, rocker arm 18 is bodily moved into a higher place, thus causing the connecting pin 14 side end portion of oscillation cam 9 to be moved into a higher position. Namely, when oscillation cam 9 is rotated into the initial position, the cam surface is caused to incline away from valve lifter 10. Accordingly, when oscillation cam 9 is caused to oscillate in response to rotation of drive shaft 2, the basic circular surface is brought into contact with valve lifter 10 for a longer period, whereas the cam surface is brought into contact with valve lifter 10 for a shorter period. Accordingly, the amount of lift is small, and an angular range from an opening timing to a closing timing, i.e., the operation angle is decreased.

On the contrary, control cam 13 is generally positioned in a lower place in the drawing, rocker arm 6 is bodily moved into a lower place, thus causing the connecting pin 14 side end portion of oscillation cam 9 to move into a lower position. Namely, when oscillation cam 9 is rotated into the initial position, the cam surface is caused to incline toward valve lifter 10. Accordingly, when oscillation cam 9 oscillates in response to rotation of drive shaft 2, the place where oscillation cam 9 is brought into contact with valve lifter 10 changes immediately from the basic circular surface to the cam surface. Accordingly, the amount of lift becomes larger and the operation angle is enlarged.

Since the position of control cam 13 can be varied continuously, the lift and operation angle of intake valve 11 can be varied continuously. Namely, both of the lift and operation angle can be increased and decreased simultaneously and continuously. Further, the opening and closing timings are varied so as to be nearly symmetrical with respect to the maximum lift phase, in response to a variation of the lift and operation angle, though depending upon how various portions of variable valve operating mechanism 1 are arranged and structured.

Figure 6:
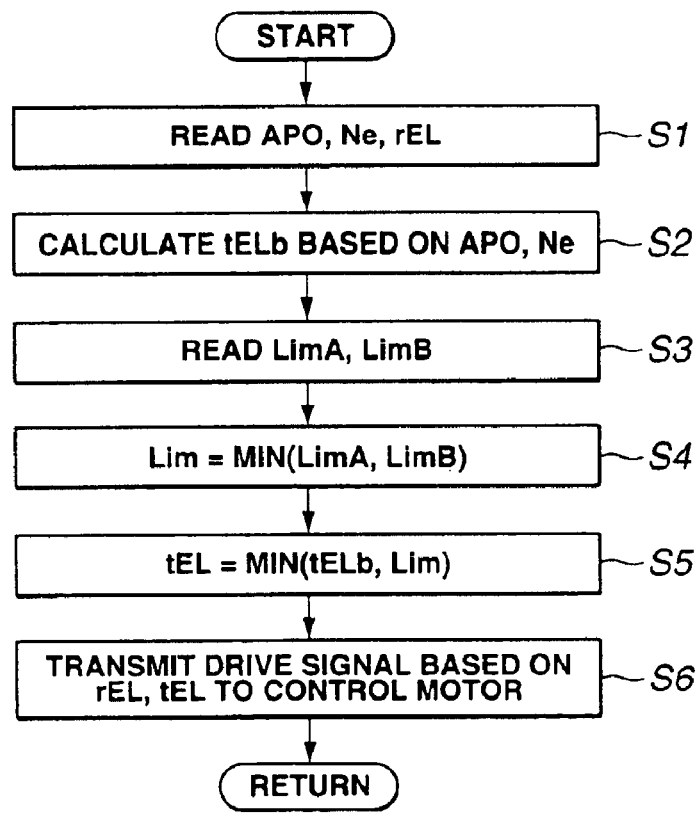
FIG. 6 is a flowchart showing a routine of transmitting a drive signal to an electric motor, that is executed by an engine control unit (ECU) of the control system of FIG. 1.

Then, a routine that is executed by engine control unit 18 for transmitting a drive signal to electric motor 15 will be described with reference to the flowchart of FIG. 6. In the meantime, the routine is executed every 10 ms.

Firstly, in step S1, from the output signals from accel position sensor 25, engine speed sensor 26 and control shaft sensor 19, accelerator opening degree APO, engine speed Ne and actual control shaft rotational angle rEL are read, respectively.

Figure 7:
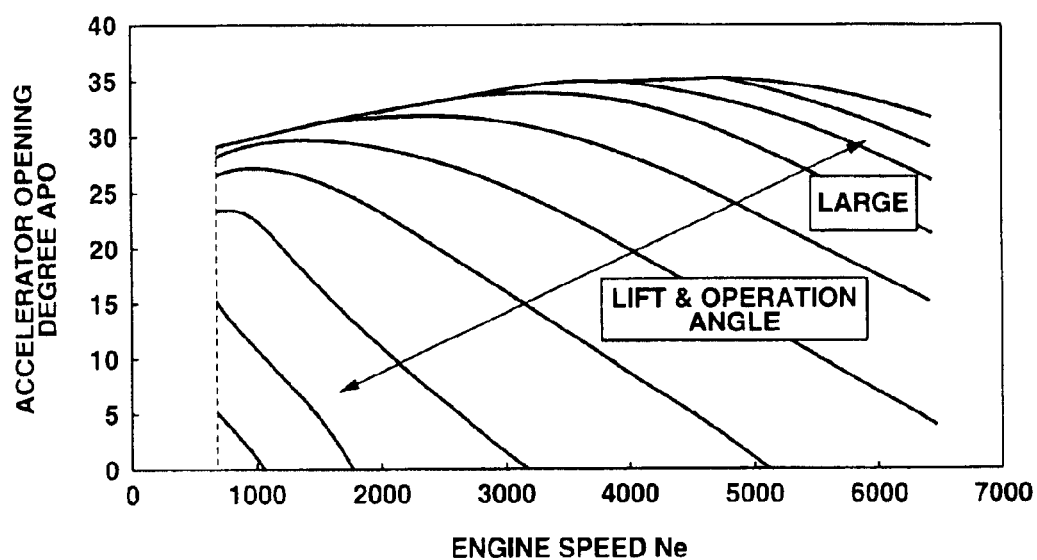
FIG. 7 is a characteristic view showing a variation of lift and operating angle in relation to an acceleration pedal opening degree and engine speed, that is attained by the variable valve operating mechanism of FIG. 1.

In step S2, based on accelerator opening degree APO and engine speed Ne is calculated target control shaft rotational angle basic value tELb. The larger the engine speed and load, the larger the target control shaft rotational angle basic value tELb becomes as shown in the lift and operation angle characteristic view of FIG. 7.

In step S3, first control shaft rotational angle limit value LimA and second control shaft rotational angle limit value LimB are read from a memory in engine control unit 18. First control shaft rotational angle limit value LimA and second control shaft rotational angle limit value LimB are calculated in the routine of FIG. 8 which will be described later.

Second control shaft rotational angle limit value LimB varies depending upon a variation of the engine speed Ne. Thus, second control shaft rotational angle limit value LimB corresponding to the present engine speed Ne is read.

In step S4, smaller one of first control shaft rotational angle limit value LimA and second control shaft rotational angle limit value LimB is set as control shaft rotation limit value Lim.

In step S5, smaller one of target control shaft rotational angle basic value tELb and control shaft rotation limit value Lim is set as target control shaft rotational angle tEL.

In step S6, a drive signal that causes actual control shaft rotational angle rEL to become closer to target control shaft rotational angle tEL is calculated, and the calculated drive signal is transmitted to drive circuit 27. Concretely, the drive current of electric motor 15 is regulated by a PID feedback control corresponding to a difference between actual control shaft rotational angle rEL and target control shaft rotational angle tEL.

Figure 8:
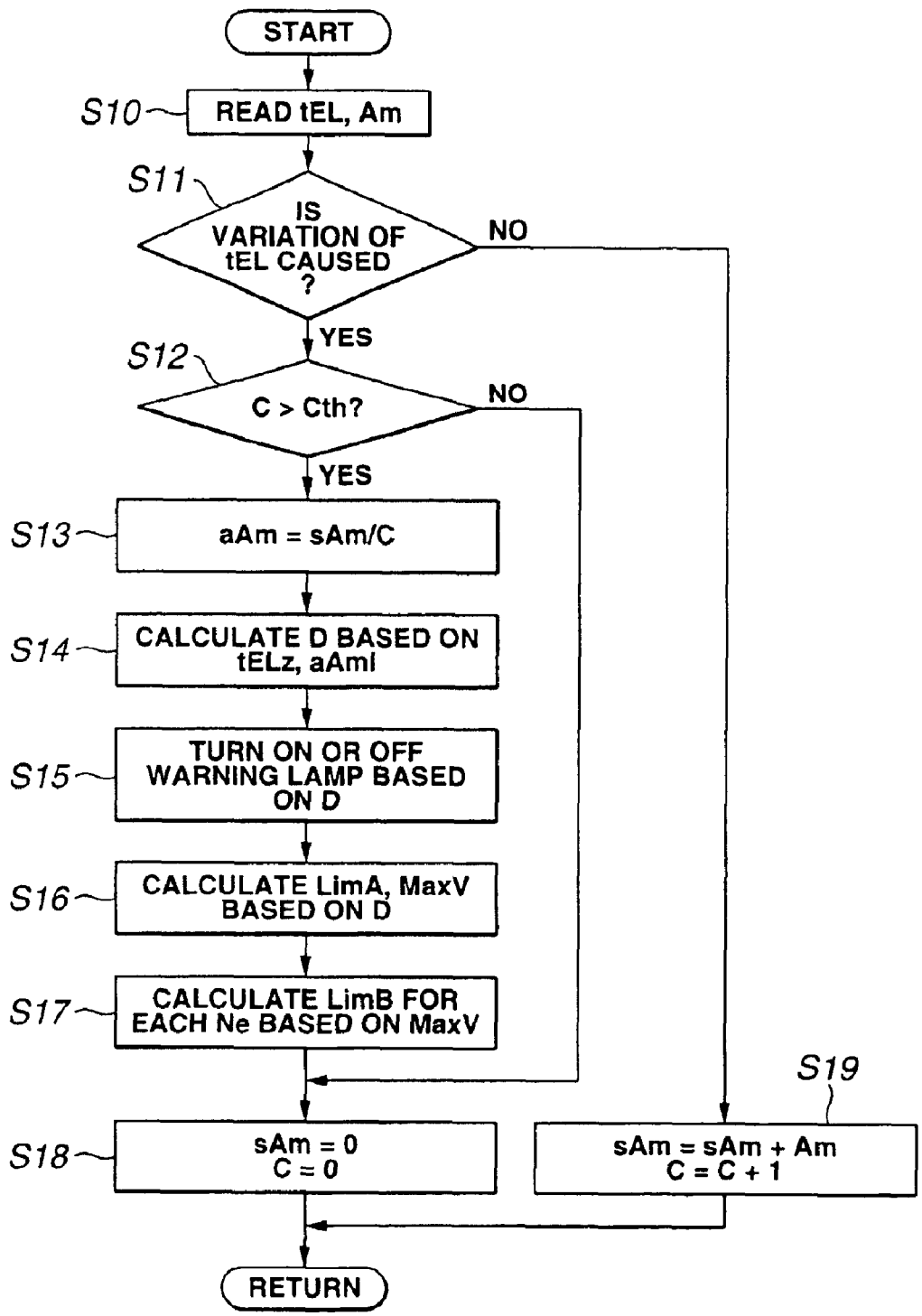
FIG. 8 is a flowchart showing a routine of calculating two control shaft rotation angle limits, that is executed by the engine control unit of the control system of FIG. 1.

FIG. 8 is a flowchart of a routine for calculating the above-described two control shaft rotational angle limit values LimA, LimB, and this routine is executed every 10 ms.

Firstly, in step S10, target control shaft rotational angle tEL is read from the memory of engine control unit 18 and at the same time electric motor drive current Am is read from the output signal of current sensor 24.

In the meantime, drive current Am of electric motor 15 can be calculated from the drive signal calculated in step S6. If so, current sensor 24 can be dispensed with.

In step S11, it is judged whether a variation of target control shaft rotational angle tEL is caused. If a variation of target control shaft rotational angle tEL is caused, the program proceeds to step S12 where it is judged whether count C is larger than threshold value Cth. Count C is the number that is obtained by counting in step S19, which will be described later, in case there is no variation of target control shaft rotational angle tEL. Count C is herein used for judging whether a condition of no variation of target control shaft rotational angle tEL has continued for a predetermined period of time.

If count C is larger than threshold value Cth, the program proceeds to step S13 where average value aAm of drive current Am during the period in which there is not caused any variation of target control shaft rotational angle tEL is calculated from the following expression.

$$Aam = sAm/C$$

where sAm is an integrated value of drive current Am and is calculated in step S19 which will be described later.

Further, in step S14, parameter D indicative of a degree of deterioration of electric motor 15 is calculated based on target control shaft rotational angle tELz having resulted from previous execution of the routine, i.e., target control shaft rotational angle tELz during the period where no variation of target control shaft rotational angle tEL was caused, and drive current average value aAm of drive motor 15. Deterioration parameter D is a value that increases with increase in the degree of deterioration.

Since a rotational torque in the direction to make smaller the lift and operation angle is always applied to control shaft 12, a predetermined drive power (holding current) is necessitated for holding the rotational angle of control shaft 12 constant. Since the rotational torque is produced by a reaction of a valve spring (not shown) that urges intake valve 11 in the direction to close, it becomes larger as the lift and operation angle become larger, thus making larger the necessary holding current. Accordingly, a predetermined proportional relation is created between the control shaft rotational angle and the holding current.

Further, when increase in the contact resistance of the brush portion of electric motor 15, partial breakage of armature, or the like deterioration is caused, larger current is required for producing the same drive torque as compared with that at the time of no deterioration. Accordingly, the proportional relation between the control shaft rotational angle and the holding current at the time of deterioration differs from that at the time of no deterioration, so that the degree of deterioration of electric motor 15 can be detected based on the degree of difference in the proportional relation.

In the meantime, the relation between the supply current and the drive torque varies a little depending upon a variation of the temperature of electric motor 15. Thus, by detecting the temperature of electric motor 15 by means of a temperature sensor 32 (refer to FIG. 1) and calculating deterioration parameter D on consideration of the detected temperature, the further accurate detection can be obtained.

Further, in step S15, ON/OFF of a warning lamp 30 (refer to FIG. 1) is controlled based on deterioration parameter D. Namely, when deterioration parameter becomes large, the lift and operation angle of each intake valve 11 is restricted, thus disabling the engine to produce a usual output. Thus, when deterioration parameter D becomes larger to a certain extent, i.e., becomes larger than a predetermined value, the warning lamp 30 is turned on to urge a driver of a vehicle to perform an inspection of the internal combustion engine.

In step S16, first control shaft rotational angle limit LimA and control shaft maximum rational speed MaxV are calculated based on deterioration parameter D.

When deterioration of electric motor 15 is in an advanced stage, the holding current having already been large is caused to become further larger, resultantly causing electric motor 15 to deteriorate rapidly. To avoid this, the upper limit of the control shaft rotational angle is restricted. The limit value for performing such restriction is first control shaft rotational angle limit value LimA, and LimA is made smaller as deterioration parameter becomes larger.

In the meantime, even at the time of restriction of target control shaft rotational angle tEL, no restrictions are put on the current itself supplied to electric motor 15. Thus, at the transition (during variation of the control shaft rotational angle toward target control shaft rotational angle tEL), there is a possibility that the motor current temporarily becomes so large. However, since electric motor 15 is being cooled by rotation of itself at the transition, a resulting influence on deterioration is smaller as compared with that resulting when large holding current flows through electric motor 15.

Further, the maximum current that drive circuit 27 of electric motor 15 can output is fixed, and the drive torque (maximum torque) of electric motor 15 resulting when the maximum current is supplied to electric motor 15 becomes smaller as the degree of deterioration becomes larger. Accordingly, the rotation speed of control shaft 12 (control shaft maximum rotation speed MaxV) resulting when the maximum current is supplied to electric motor 15 becomes smaller as the degree of deterioration becomes larger (i.e., deterioration parameter D becomes larger).

In step S17, second control shaft rotational angle limit value LimB for each engine speed is calculated based on control shaft maximum rotation speed MaxV.

Although variable valve operating mechanism 1 of this embodiment has a link mechanism that is more complex as compared with that of the usual valve operating mechanism, the friction of variable valve operating mechanism 1 during operation of the engine is not so large as compared with that of a usual valve operating mechanism.

However, the friction of variable valve operating mechanism 1 during engine stop is larger than that of the usual valve operating mechanism and particularly so larger than the same when control shaft 12 is in a condition of realizing a large lift and a large operation angle. Accordingly, if the engine stops with control shaft 12 being held in a condition of realizing a large lift and a large operation angle, a large engine starting torque is necessitated at next start of the engine, thus causing a possibility of deteriorating the engine starting ability. For this reason, electric motor 15 is provided with an ability of returning control shaft 12 back to the standard position (i.e., minimum lift and operation angle position), even if unexpected engine stop is caused, before rotation of the engine is completely stopped.

However, when deterioration of electric motor 15 gets worse so as to cause control shaft maximum rotation speed MaxV to become smaller, it becomes impossible to return control shaft 12 to the standard position upon sudden stop of the engine. To avoid this, the upper limit of control shaft rotational angle is restricted in accordance with the present degree of deterioration. The limit value for performing such restriction is second control shaft rotational angle limit value LimB, and LimB is made smaller as deterioration parameter D becomes larger.

However, the period of time from occurrence of engine stop till complete stoppage of rotation of the engine varies depending upon a variation of engine speed Ne immediately before engine stop, so that second control shaft rotational angle limit value LimB for various engine speeds (e.g., engine speeds from idle speed to maximum speed at intervals of 500 rpm) are calculated and stored in a control table (LimB-Ne).

Further, in step S18, integrated value sAm used for calculating electric motor drive current average value aAm and count C are reset to zero.

On the other hand, if it is determined in step S11 that no variation of target control shaft rotational angle tEL is caused, the program proceeds to step S19 where integrated value sAm immediately before this time is added with electric motor drive current Am having been read this time to calculate the up-to-date integrated value sAm, while at the same time count C is increased by one.

By the above-described control, it becomes possible to restrain electric motor 15 from deteriorating further and prevent the same from being lowered in the durability, while at the same time it becomes possible to retain a good engine startability after sudden engine stop.

In the meantime, in place of using two control shaft rotational angle limit values LimA, LimB, two control shaft rotational angle correction values can be used. Concretely, a first control shaft rotational angle correction value and a second control shaft rotational angle correction value that assume 1 when corresponding to a condition of no deterioration and become smaller as deterioration parameter D becomes larger are calculated. By correcting target control shaft rotational angle tEL by smaller one of the correction values, the similar effect can be obtained.

In case control shaft rotational angle limit values LimA, LimB are used, the output characteristics of the engine in the low-load engine operating range do not vary from the time of no deterioration and the engine output in the high-load engine operating range does not vary even if the accelerator opening degree is varied. On the other hand, in case the correction values are used, the output characteristics of the engine in response to the accelerator opening degree are generally shifted to a lower output side.

Further, while in this embodiment the holding current of electric motor 15 is directly detected to calculate deterioration parameter D, the holding current can be indirectly detected from the temperature of electric motor 15. Namely, in the condition where the control shaft rotational angle is nearly constant, almost all of the consumed electric power is converted into heat, so that from the temperature of heat emitted by electric motor 15 the holding current can be estimated.

Figure 9:
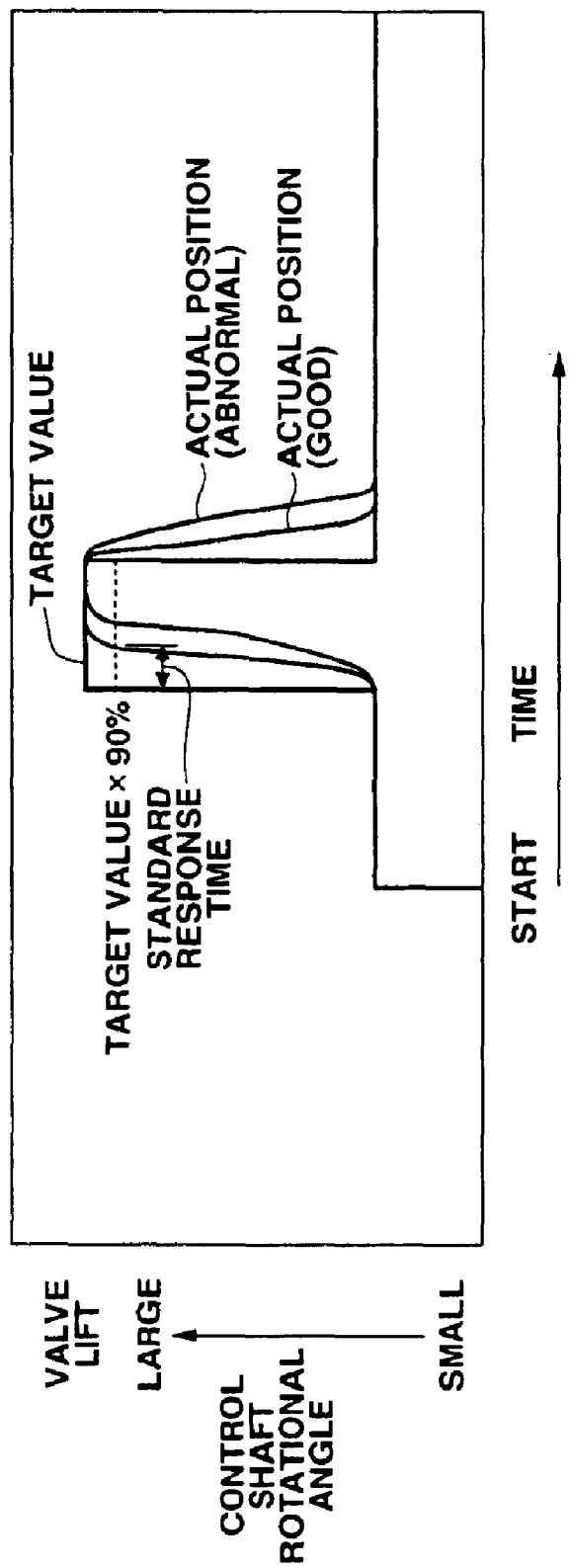
FIG. 9 is a characteristic view of a target valve lift and an actual valve lift in relation to a control shaft rotational angle, for illustrating a method of judging a deteriorated condition of an electric motor, that is executed by the engine control unit of the control system of FIG. 1.

FIG. 9 is a characteristic view for illustrating a method of judging a deteriorated condition of electric motor 15, that is executed by engine control unit 18, according to a second embodiment of the present invention.

Herein, a diagnosis pattern for changing a target value of valve lift immediately after start of the engine is performed, and a deteriorated condition of electric motor 15 is determined (i.e., deterioration parameter D is calculated) based on the response time for 90% of the target value to be reached.

Immediately after start of the engine, a throttle valve (not shown) of the engine is held closed, so that the density of air downstream of the throttle valve is low and a variation of a flow rate of air in response to a variation of lift and operation angle is small. For this reason, the judgment on deterioration can be performed without giving a strange feel to a vehicle driver.

In the meantime, no influence on the drivability is caused immediately before the engine key is turned off, so that the diagnosis may be made immediately before the engine key is turned off.

Figure 10:
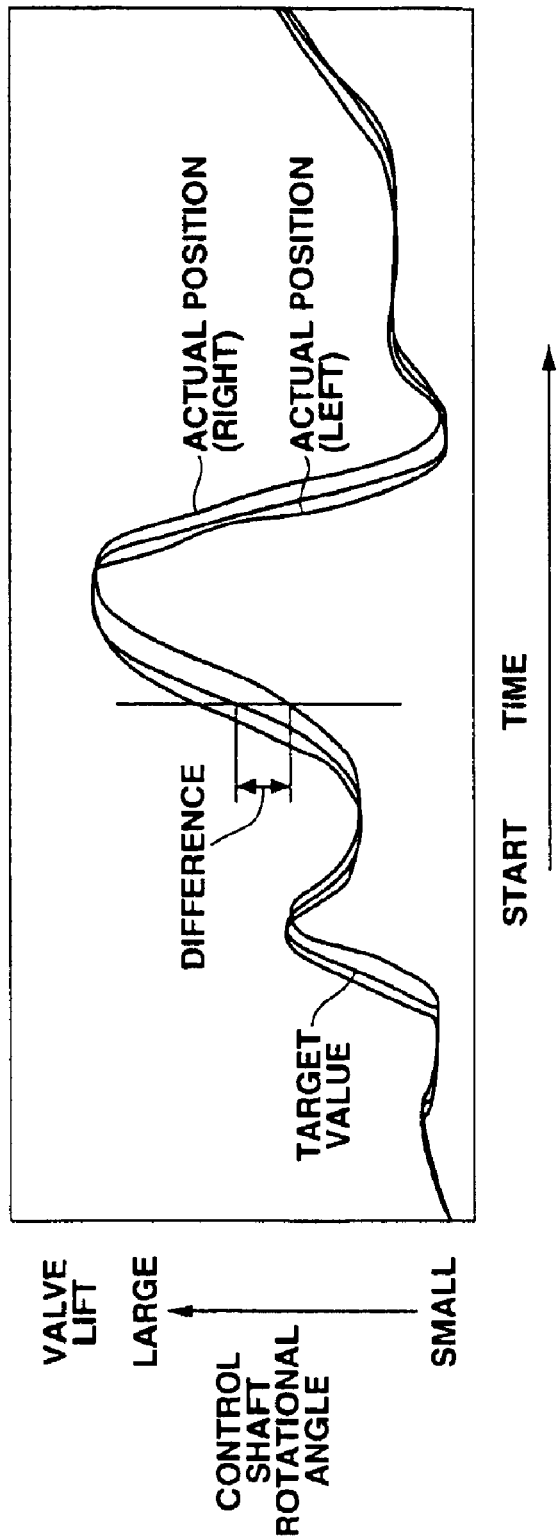
FIG. 10 is a characteristic view of left and right bank actual valve lifts in relation to a control shaft rotational angle, for illustrating a method of judging a deteriorated condition of an electric motor according to a second embodiment of the present invention.

FIG. 10 is a characteristic view for illustrating a method of judging the deteriorated condition of electric motor 15 in case the control system is applied to a V-type internal combustion engine, that is executed by engine control unit 18, according to the third embodiment of the present invention.

Namely, in the V-type internal combustion engine, it is necessary to provide respective left and right banks 31 (refer to FIG. 1) with independent variable valve operating mechanisms 1, 1 and electric motors 15, 15.

Since it is quite rare in the V-type internal combustion engine that deterioration phenomena of electric motors 15, 15 of both variable valve operating mechanisms 1, 1 on the respective banks 31 occur simultaneously. Thus, by monitoring the operation responsiveness of each of control shafts 12, 12 on the respective banks 31, judgment on the responsiveness can be made without executing a particular diagnosis pattern.

A specific diagnosis method is that when the difference between the lift target value and each of the actual positions on the respective bank sides exceeds a reference value, it is judged that one of electric motors 15, 15 is not good (refer to FIG. 10).

In the meantime, since the difference between the actual position and the lift target value varies largely, it is a good idea to make the judgment based on an integrated value or average. Further, as shown in FIG. 11, it is a useful means to make a judgment on the deterioration based on the difference in the angular velocity of control shaft 12 between the left and right banks 31.

Figure 12A:
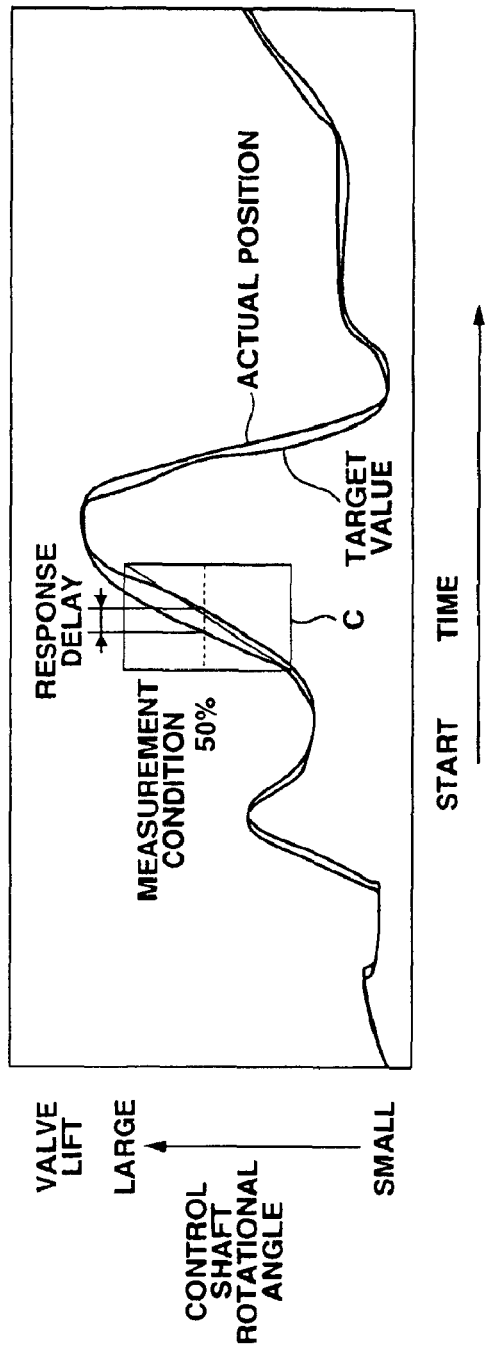
FIG. 12A is a characteristic view of variations of a target valve lift and an actual valve lift in relation to a control shaft rotational angle, for illustrating a method of judging a deteriorated condition of an electric motor according to a third embodiment of the present invention.
Figure 12B:
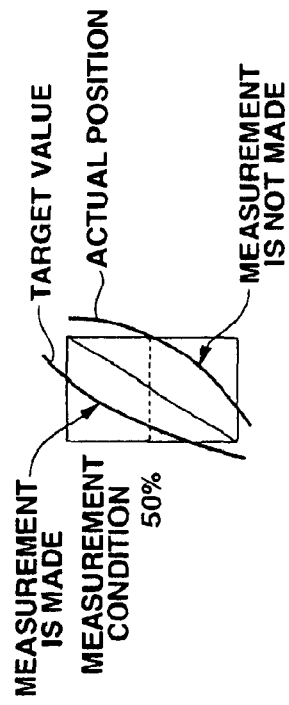
FIG. 12B is an enlarged view of a portion within an area "C" of FIG. 12A.

FIGS. 12A and 12B are characteristic views for illustrating a method of judging deterioration of electric motor 15 according to a third embodiment of the present invention. When the lift target value is changed largely, the actual position differs largely from the lift target value. This is because a large drive torque is applied to electric motor 15 in response to a large variation of the lift target value.

In case a variation of the lift target value is small, it is difficult to determine the difference in the responsiveness between the usual control and the control at the time of deterioration of electric motor 15. For example, in the usual control, 50% of a maximum driving force may be used to carry out the control. In contrast to this, 70% of the maximum driving force may be used to retain the responsiveness at the time of deterioration. However, in case of a large variation of the lift target value, 100% of the maximum driving force is necessitated even at the usual control, so that the deterioration causes an influence on the responsiveness.

Accordingly, if a judgment on deterioration of electric motor 15 is made based on the responsive delay resulting when the lift target value is changed by an amount equal to or larger than a predetermined value, the judgment can be done accurately during a usual operation of the engine without requiring a particular diagnosis pattern.

Namely, in the range in which the lift target value is varied by an amount equal to or larger than a predetermined value within a predetermined period of time, the responsiveness is judged with a delay of time, for example, a delay of time when the actual position reaches 50% of the lift target value. Since electric motor 15 decreases in the speed when the lift target value goes close to the actual value, a judgment is made when the actual position reaches 50% of the lift target value.

Figure 13:
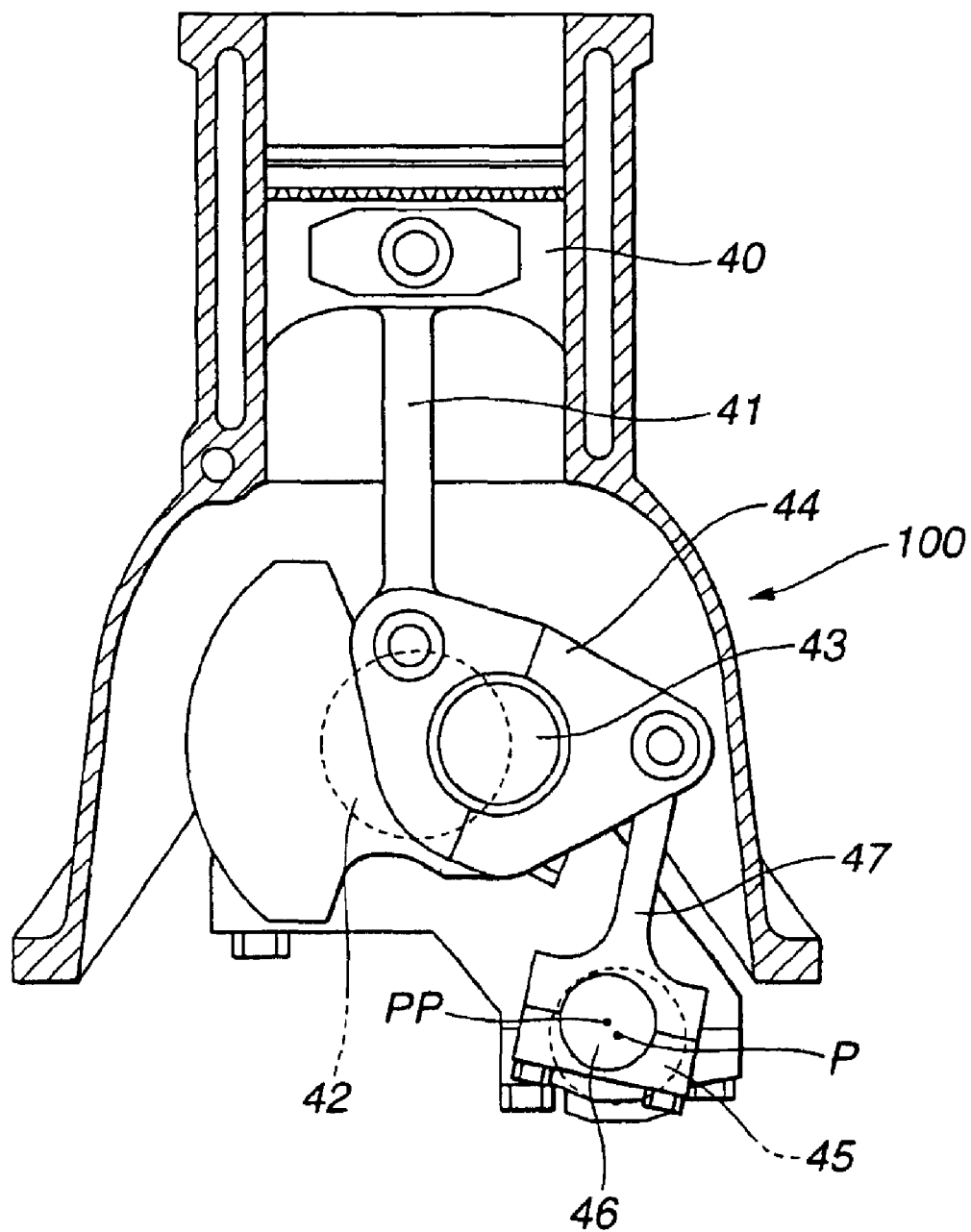
FIG. 13 is a compression ratio control mechanism that is controlled by a control system according to a fourth embodiment of the present invention.

The control system of the present invention can be used with various variable control mechanisms for varying engine performance characteristics of an internal combustion engine. For example, the control system of the present invention can be used with a compression ratio control mechanism for variably controlling a compression ratio as shown in FIG. 13, according to a fourth embodiment of the present invention.

The structure of the compression ratio control mechanism is disclosed in Japanese Patent Unexamined Publication No. 2002-21592 that was proposed by the assignee of this application and therefore only brief description will be made thereto.

Namely, the compression ratio control mechanism includes upper link 41 connected to piston 40, lower link 44 connected to upper link 41 and to crank pin 43 of crankshaft 42, and control link pivotally connected to lower link 44 and to eccentric cam 46 provided to control shaft 45 for controlling the freedom of lower link 44.

Rotation of control shaft 45 by means of an actuator (not shown) varies the rotational position of eccentric cam 46 and thereby varying the top dead center of piston 40 and therefore the compression ratio.

Herein, the force applied to control shaft 45 is determined mainly by the amount of intake air and is not so influenced by a variation of the compression ratio. However, a variation of the compression ratio causes a variation of the relative position between center axis P of control shaft 45 and center axis PP of eccentric cam 46 and therefore a variation of input torque of control shaft 45.

Accordingly, in the fourth embodiment, similarly to the first embodiment, deterioration of the actuator can be judged based on the responsiveness of control shaft 45. When it is judged that deterioration of the actuator is caused, a control for avoiding an operation range in which the input torque of control shaft 45 is large is performed. By this, it becomes possible to restraint the actuator from deteriorating further.

The entire contents of Japanese Patent Applications P2002-277092 (filed Sep. 24, 2002) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, the variable valve operating mechanism can be of the kind that varies only the valve lift or only the operation angle (opening and closing timings) of an intake valve or an exhaust valve. Further, the object on which the detection of the operation responsiveness is made is not limited to the control shaft of the variable valve operating mechanism but the detection can be made directly with respect to the actuator. The scope of the invention is defined with reference to the following claims.

What is claimed is:

1. A control system for an internal combustion engine having a variable valve operating mechanism capable of varying at least one of a valve lift and an operation angle of an engine valve continuously, comprising:

a detecting device that detects an operating condition of the variable valve operating mechanism and produces a signal representative thereof; and a controller that controls the operating condition of the variable valve operating mechanism in response to the signal from the detecting device;

the controller being programmed to determine whether an operation responsiveness of the variable valve operating mechanism is lowered based on the signal from the detecting device and vary operational characteristics of the variable valve operating mechanism when the operation responsiveness of the variable valve operating mechanism is lowered;

wherein the variable valve operating mechanism includes an actuator and a control shaft that is driven by the actuator so as to vary in a rotational angle thereof and thereby variably control one of the valve lift and the operation angle, the controller being programmed to determine whether the operation responsiveness of the variable valve operating mechanism is lowered based on a holding energy of the actuator for holding the control shaft at a target rotational angle when a target rotational angle of the control shaft is held constant for a predetermined period of time.

2. A control system according to claim 1, wherein the controller is programmed to make a diagnosis of the operation responsiveness of the variable valve operating mechanism during operation of the engine.

3. A control system according to claim 1, wherein the controller is programmed to make a diagnosis of the operation responsiveness of the variable valve operating mechanism immediately after start of the engine.

4. A control system according to claim 1, wherein the engine is of an V-type and has the variable valve operating mechanism at each of banks thereof, the controller being programmed to determine whether the operation responsiveness of the variable valve operating mechanism at each of the banks is lowered.

5. A control system according to claim 1, further comprising a warning lamp that is turned on when a deterioration parameter indicative of a degree of deterioration of the actuator becomes larger than a predetermined value.

6. A control system according to claim 1, wherein the variable valve operating mechanism includes an actuator and a control shaft that is driven by the actuator so as to vary in a rotational angle thereof and thereby variably control one of the valve lift and the operation angle, the controller being programmed to limit the rotational angle of the control shaft and thereby make smaller one of the valve lift and the operation angle when the operation responsiveness of the variable valve operating mechanism is lowered.

7. A control system according to claim 6, wherein limitation of the rotational angle of the control shaft is attained by varying a holding energy of the actuator for holding the control shaft at a target rotational angle.

8. A control system according to claim 6, wherein the controller is programmed to generate a map for setting a rotational angle limit of the control shaft in accordance with engine speed when the operation responsiveness of the variable valve operating mechanism is lowered.

9. A control method for an internal combustion engine having a variable valve operating mechanism capable of varying at least one of a valve lift and an operation angle continuously, the method comprising:

detecting an operating condition of the variable valve operating mechanism and producing a signal representative thereof by means of a detecting device; and controlling the operating condition of the variable valve operating mechanism in response to the signal from the detecting device;

the controlling including determining whether an operation responsiveness of the variable valve operating mechanism is lowered based on the signal from the detecting device and varying operational characteristics of the variable valve operating mechanism when the operation responsiveness of the variable valve operating mechanism is lowered;

wherein the variable valve operating mechanism includes an actuator and a control shaft that is driven by the actuator so as to vary in a rotational angle thereof and thereby variably control one of the valve lift and the operation angle, and the controlling comprises determining whether the operation responsiveness of the variable valve operating mechanism is lowered based on a holding energy of the actuator for holding the control shaft at a target rotational angle when a target rotational angle of the control shaft is held constant for a predetermined period of time.

10. A control method according to claim 9, wherein the controlling comprises making a diagnosis of the operation responsiveness of the variable valve operating mechanism during operation of the engine.

11. A control method according to claim 9, wherein the controlling comprises making a diagnosis of the operation responsiveness of the variable valve operating mechanism immediately after start of the engine.

12. A control method according to claim 9, wherein the engine is of an V-type and has the variable valve operating mechanism at each of banks thereof, and the controlling comprises determining whether the operation responsiveness of the variable valve operating mechanism at each of the banks is lowered.

13. A control method according to claim 9, further comprising turning on a warning lamp when a deterioration parameter indicative of a degree of deterioration of the actuator becomes larger than a predetermined value.

14. A control method according to claim 9, wherein the limiting of the rotational angle of the control shaft comprises varying a holding energy of the actuator for holding the control shaft at a target rotational angle.

15. A control method according to claim 9, wherein the controlling comprises generating a map for setting a rotational angle limit of the control shaft in accordance with engine speed when the operation responsiveness of the variable valve operating mechanism is lowered.

16. A control system according to claim 1, wherein the controller is programmed to limit the rotational angle of the control shaft on the basis of smaller one of a first control shaft rotational angle limit value and a second control shaft rotational angle limit value that become smaller as a deterioration parameter indicative of deterioration of the actuator becomes larger, the first control shaft being determined based on the deterioration parameter for limiting the holding energy of the actuator, the second control shaft rotational angle limit value being determined based on a control shaft maximum rotational speed and an engine speed for enabling the control shaft to return to a predetermined position upon stop of the engine.

17. A control system for an internal combustion engine having a variable valve operating mechanism which is driven by an electric motor to vary valve lift characteristics, comprising:

a detecting device which detects an electric energy consumed by the electric motor; and a controller programmed to:
determine a target of the valve lift characteristics in accordance with an engine operating condition;
control the electric motor so as to achieve the target;
determine whether an operation responsiveness of the variable valve operating mechanism is lowered based on the electric energy for holding actual valve lift characteristics at the target; and
vary the target when the operation responsiveness is lowered.

* * * * *